United States Patent [19]
Dyfverman

[11] Patent Number: 4,496,991
[45] Date of Patent: Jan. 29, 1985

[54] METHOD IN THE EDITING OF KINEMATOGRAPHIC PICTURE MATERIAL

[76] Inventor: Tomas Dyfverman, Vasavägen 8, S-171 39 Solna, Sweden

[21] Appl. No.: 365,983

[22] Filed: Apr. 6, 1982

[30] Foreign Application Priority Data

Apr. 14, 1981 [SE] Sweden .............................. 8102411

[51] Int. Cl.³ ...................... H04N 5/87; H04N 9/491
[52] U.S. Cl. ................................. 358/311; 360/14.1; 360/14.2
[58] Field of Search ...................... 358/310, 311, 332; 360/14.1, 14.2, 14.3

[56] References Cited

U.S. PATENT DOCUMENTS 3,030,441  4/1962  Nemeth .............................. 360/14.1

FOREIGN PATENT DOCUMENTS 1541925  3/1979  United Kingdom .

OTHER PUBLICATIONS van Dael, J. W., "Disturbances Occurring at Edits on PAL 625-line Video Tapes", EBU-review, No. 172, Dec. 1978, pp. 265–281.

*Primary Examiner*—Michael A. Masinick
*Attorney, Agent, or Firm*—Browdy and Neimark

[57] ABSTRACT

In a method for editing kinematographic color picture material which, when finalized, shall have the form of a color video tape, the following procedural steps are carried out. The original picture material, which may either have the form of a color film or a color video tape, is transferred onto the other material form so as to obtain both a film copy and a video tape copy with the same picture content. The film copy is provided with a continuous periodically occurring, visual marking, with the guidance of which it is possible to determine for each film frame the location of the corresponding video image on the video tape copy within the periodic video field sequence of the video signal. When using the PAL-system, every second film frame is advantageously provided with a marking, which marking may have two different forms used alternatively with one another. The video tape copy is now considered as an original, while the film copy is used as a work print, which is edited in the manner desired employing conventional film-editing techniques, it being observed however that each splice between two mutually sequential scenes is so located as not to interrupt the periodic, regular marking in the finally edited work print. The video tape copy is then used for producing a conformed video tape in exact conformity with the edited film work print by means of video-to-video transfer technique.

7 Claims, 1 Drawing Figure

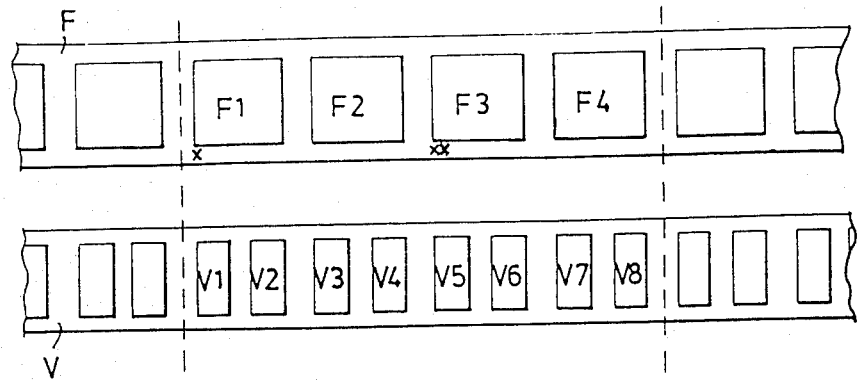

METHOD IN THE EDITING OF KINEMATOGRAPHIC PICTURE MATERIAL

FIELD OF INVENTION

The present invention relates to a method in the editing of kinematographic or motion picture material, which when in its finalized state shall be in the form of colour video tape.

BACKGROUND

It is becoming more and more desired and customary, particularly, for example in the case of television broadcasting and videograms, that the finally edited picture material, as ready for transmission or viewing, shall be in the form of colour video tape. In some cases the picture material can be shot originally on colour film, and in other cases on colour video tape. In the latter case it may seem a natural course to do the editing using video tape techniques, since both the original material and the desired end-product are both video tapes. Also in the former case it may appear that the simplest procedure is to copy the original film material onto a video tape and then to edit the tape using video tape techniques. Such video tape editing, generally called video transfer editing, is performed by copying desired sections of the original video tape onto a new recording tape in given positions thereon, so that the specific desired sections, or scenes, are obtained in the order desired. Although this editing technique may appear to be relatively simple, it is often desirable to be able to carry out the editing work on film material. One reason for this is the possibility then afforded of employing the accurate and simple sound processing techniques well tried in film editing. There is also to be found with producers and in film laboratories and like establishments vast quantities of film-recording and film-editing equipment whose continued use is highly desirable for economic reasons. Another reason is that many editors consider themselves capable of producing a much better result, both qualitatively and artistically, when editing film material than when editing video tape. In this case, however, the necessary preparation of a colour video tape, which is the desired end product, in exact conformity with the finally edited film work print, the so-called video tape conforming, creates certain problems, deriving from the construction of the colour video signal.

Quite apart from its content of visual information, which has the nature of a succession of images corresponding to the picture frames of a motion picture film, the video signal is constructed to include also periodic signal components which extend over a plurality of successive images. When considering, for example, the PAL-system generally used for colour video in Europe and in a host of other countries, it is found that the video signal is so constructed as to comprise for each complete image, corresponding to a picture frame in a motion picture film, two immediately sequential half-images, so-called video fields. In addition, the video signal also includes a periodically repeated signal component with a period extending over four such video fields, i.e. over two complete images corresponding to two film frames, and a further, periodically repeated signal component with a period extending over eight video fields, i.e. over four complete images corresponding to four film frames, and which is synchronized with the first mentioned signal component extending over four video fields, i.e. has a fixed phase position relative said first mentioned signal component. The video technique has as an absolute condition that no interruptions or discontinuities appear in the first signal component with a period of four video fields, and that in order to obtain a perfect result when showing the video tape, neither should any discontinuities occur in the second signal component with a period of eight video fields. Neither should there be any deviations in the predetermined, mutual phase position between the 4-field sequence signal and the 8-field sequence signal. This presents normally no serious problem when editing from video tape using the aforementioned video transfer editing technique, since the professional video recording equipment used will automatically ensure that the aforementioned conditions are fulfilled by the recorded video signal. If the editor orders a scene transition "cut" between two sequential scenes at a location such that the aforementioned conditions concerning the 4-field sequences and 8-field sequences would not be satisfied by the recorded video signal, the recording equipment will automatically displace the scene transition or "cut" to a location where said conditions will be fulfilled, i.e. so that the last video field of a preceding scene and the first video field of the immediately following scene are those which follow each other immediately in the predetermined periodic field sequence of the video signal. Normally, such a displacement of the "cut" is not detrimental to the editing work, since the result can be seen and assessed directly; moreover any sound recording present will be displaced to exactly the same extent, thereby to maintain the synchronization between sound and picture.

This problem, however, is extremely troublesome when conforming a colour video tape with an edited film work print and associated sound track. Admittedly, the video recording equipment used will ensure, in the aforesaid manner, that the scene transitions or "cuts" between the various scenes on the conformed video tape are so located as to satisfy the said conditions concerning the periodic video field sequences, but the displacement of the "cuts" necessary herefor during the video tape conforming process has as result that said "cuts" will no longer have exactly the same positions as the scene transitions or cuts in the edited film work print. Consequently, the locations of the scene transitions, often chosen with great care by the editor, will be displaced, which can naturally be regarded as a serious error. A more serious disadvantage is that the automatic displacement of the scene transitions carried out by the video recording equipment in order to fulfill the aforesaid conditions concerning the video signal, results in a lack of synchronism between picture and sound, the sound in this case not being displaced to the same extent as the picture images. Such asynchronism cannot be accepted.

As will readily be understood, the above problem cannot be solved by transferring the edited film, the so-called work print, directly onto a video tape by means of a so-called telecine equipment, since the damage caused to the film during the editing process prevents a video tape of acceptable quality being obtained. One possible method would be to conform a faultless film material in a conventional manner, into exact agreement with the edited film work print, and to transfer said conformed film onto a video tape by means of a telecine. The production work involved in such a method, however, is extremely time consuming, requiring two similar film copies to be made from the originally taken picture material, of which copies one is used as the work print and the other for the subsequent film conforming. When the original picture material is on film, it is thus necessary to produce an additional work print on film, while when the original picture material is on video tape, it is necessary to produce from said tape two film copies. Much time and expense is incurred in both instances.

SUMMARY

Consequently, an object of the invention is to provide a novel method for editing kinematographic colour picture material, which enables editing to be carried out with the use of film and thereafter a colour video tape to be produced in which the scene transitions or "cuts" are located in exactly the same locations as on the edited film work print, i.e. so that all scenes on the video tape have exactly the same length as on the edited film work print and so that no asynchronism can occur between picture and sound.

BRIEF DESCRIPTION OF DRAWING

The sole FIGURE constitutes a schematic illustration of an example of the relationship between the picture frames of the film and the video fields of the video tape.

DETAILED DESCRIPTION OF EMBODIMENTS

The method according to the invention is characterized by the following procedural steps:

(a) Using the originally shot colour picture material, which may be in the form of either colour film or colour video tape, a copy is produced in the other material form. In this way there is obtained a film copy and a video tape copy having exactly the same picture content;

(b) The film copy F is throughout its length provided with a continuous, periodically occurring, visual marking, e.g. "x" in FIG. 1, from which it is possible, with the guidance thereof, to determine for each picture frame on the film the location of the corresponding picture on the video tape copy V within the periodic field sequence of the video system being used. When using the PAL-system, in which each picture frame on the film copy is corresponded by two sequential video fields on the video copy, each alternate frame on the film copy can, for example, be provided with a predetermined visual marking indicating that the two video fields on the video tape copy corresponding to said film frame are the first two fields in the 4-field sequence of the video signal on the video tape. Advantageously, the said markings on every second picture frame on the film copy may be of alternating different appearance, so that said markings also indicate the position of the video fields on the tape copy, corresponding to a given film frame, within the 8-field sequence of the video signal. This makes it possible in the subsequent editing process to take also the 8-field sequence of the video signal into consideration. The markings may, for example, consist of alternate single and double transverse lines applied on every second frame bar on the film copy. Other kinds of markings can also, of course, be used.

(c) The video tape copy is hereafter considered as an original copy.

(d) The film copy, on the other hand, is used as a film work print and is edited by means of conventional film-editing techniques. In this editing work it is ensured, however, that each cut or scene splice between two sequential scenes is so placed that the film frames located on both sides of the cut, i.e. the last frame in the preceding scene and the first frame in the following scene, are such whose corresponding video fields on the video tape copy have immediately sequential locations within the periodic video field sequence of the video signal. This can readily be determined with the guide of the visible marking on the film copy. Thus, if in the marking system described in the aforegoing by way of example the last frame of a preceding scene is located in front of a single marking line on the film, the first frame of the subsequent scene must be a frame located behind a single marking line. On the other hand, if, for example, the last frame of the preceding scene is located in front of a double marking line, the first frame of the subsequent scene must be located behind a double marking line or, optionally, after a single marking line, when no attention is paid to the 8-field sequence of the video signal. Expressed generally, the cuts or scene transitions can be placed wheresoever, provided that it is ensured that splicing of two sequential scenes does not give rise to any changes in the periodically occurring marking on the spliced, i.e. edited, film work print.

(e) Subsequent to the completed editing of the film work print in the aforedescribed manner, the video tape copy, which has been stored as the original, is used for producing a video tape in exact conformity to the edited film work print, by transferring each scene in the edited film work print from the "original" video tape copy onto a new video tape in the same order as the scenes have on the film work print. During this video tape conforming the scene transitions or "cuts" between sequential scenes will not be displaced, since said trnasitions have been correctly positioned with respect to the periodic field sequence of the video signal when editing the film work print.

It will be understood that when conforming the video tape material in step (e) it is necessary to be able to select from the video tape copy exactly those sections which correspond to the various scenes in the edited film work print, with a high degree of accuracy. In order to facilitate this, and to enable said selection to be carried out with the desired accuracy, it is an advantage to first subject the edited film work print to a so-called listing operation, in which the location, in the original film material, of the first frame and the last frame of each scene is recorded with the guide of the edge numbers on the edge of the film. In itself, this is a conventional process when editing film material. These edge numbers, however, are not found on the video tape material and cannot therefore be used directly for finding the corresponding "frames" on the video tape copy. Instead, the video tape is provided with a time code, and hence the edge number values for the first and the last frames in each scene in the finally edited film work print must be converted into the time code values for the corresponding "frames" in the video tape copy. In order to make such conversion possible, it is preferred to proceed in conjunction with the copying process in step (a) in a manner such that, prior to the actual copying process, one provides each roll of the original picture material, i.e. either each film roll or each video tape roll which has been shot with a reference symbol on at least one picture frame, which symbol is unique for the roll in question and which will be visible also on the corresponding picture frame of the other copy of the picture material, which is produced by the copying process. Subsequent to the copying process, the position of each film frame provided with a reference symbol in the film copy is determined and registered expressed in edge number value, and, correspondingly, the position of each symbol-marked frame in the video tape copy is also determined and registered expressed in time code values. For each picture frame provided with a reference symbol there is obtained in this way information concerning its position in the film copy, expressed in edge number values, and its position in the video tape copy, expressed in time code values. These associated edge number values and time code values can then be used for an exact conversion of the edge number values for the first and the last frames in each scene in the finally edited film work print into the time code values for corresponding frames in the video tape copy. Both the listing of the finally edited film work print and the aforesaid conversion of edge number values to corresponding time code values can be effected to advantage with the use of an apparatus of the design described in my Swedish Patent Application No. 8102410-1.

The copying process in step (a) and the marking of the film copy in step (b) can be carried out in a variety of ways, partly depending on whether the original picture material comprises a film or a video tape.

When the original picture material comprises a film, the film can be marked prior to the copying process of step (a), for example in conjunction with developing the film, or in a separate marking process after the film has been developed but prior to copying the film onto a video tape. It is also conceivable to provide the film with the requisite marking already in the manufacturing stage, for example in the form of a latent marking which becomes visible when the film is developed. It will be understood from the aforegoing that the marking of the film can be effected prior to copying the film onto a video tape, since it is already known how the film markings must be arranged in view of the video system being used, for example in the form of the aforedescribed alternate single and double transverse lines on every second frame bar of the film in the case of the PAL-system. In the subsequent copying of the film onto video tape in step (a) it must now be ensured that the periodic video field sequence of the video tape will lie in a predetermined, fixed phase position relative to the markings already present on the film. This can be achieved by electronically analysing the video signal with respect to the phase position of its periodic field sequence when transferring each film roll onto video tape, and by synchronizing the video recording equipment with the film transport mechanism in the telecine equipment used; ensuring that the periodic field sequence of the video signal takes a predetermined phase position relative to the markings present on the film. This phase position must be the same for all rolls of film transferred onto video tape.

The film copy, however, can also be marked after transferring the film onto the video tape, in step (a). This can be effected to advantage, when copying each film roll onto a video tape for producing the video tape, by transferring at least part of the film roll onto an additional video tape, preferably by means of a video cassette recorder provided with still-frame viewing. This recording of at least part of the roll of film onto an additional video tape is advantageously carried out with the use of that part of the film roll containing the frame provided with a reference symbol as described in the aforegoing, whereby this symbol-marked frame will appear also on the additional video tape. During this recording process the video signal is analysed electronically with respect to the phase position for its periodic field sequence and on the additional video tape there is recorded superimposed, electronically generated indications giving the phase position for the periodic field sequence of the video signal. Subsequent to transferring the whole of the roll of film onto video tape, the film roll is markd by passing the film roll through a separate marking machine, designed to provide the film with the desired regularly appearing markings, for example markings of the kind described in the aforegoing. Such a machine, for example, may comprise in principle a conventional film-transport mechanism provided with a sprocket feed wheel and a marking roller which is synchronized with said wheel and which mechanically marks the film in the manner desired. Marking can also be effected, for example, with the use of hot foil technique or by spraying a colouring substance onto said film or perforating the same. In order that the markings shall obtain the correct "phase" position" on the film roll, the aforementioned indications of the phase position of the periodic video field sequence of the video signal on the additional video tape are studied with the aid of the still-frame viewing of the cassette tape recorder. It is particularly advantageous to study the position of said indications relative to the readily discernible reference-marked frame, which can also readily be refound on the film roll. The film roll is not laced up in the marking machine in a manner such that the markings on the film roll obtain precisely the corresponding positions relative to the reference-marked film frame as those positions of said indications relative the reference-marked frame on the additional video tape. It will be understood that it is an advantage for the reference-marked film frame to be located at that end of the film roll which is first fed into the marking machine.

When the original picture material is in video tape form, marking of the film copy is effected advantageously at the same time as said film copy is produced from the video tape. This can be carried out by analysing the video signal with respect to the phase position of its periodic field sequence when transferring the video tape onto a film by means of a kinescope recording equipment, and electronically producing in the electronic video-image markings of the desired kind which coincide with the phase position of the periodic video field sequence. These markings are therewith also obtained automatically on the film photographed from the picture tube of the kinescope equipment.

It will readily be understood that the various procedural steps can be varied in detail and greatly modified within the scope of the invention with respect to particular requirements in each particular case, and with respect to the design of the equipment used.

Thus, when practicing the method according to the invention both reversal film and negative film can be used. When the original picture material is in video tape form it is, of course, not necessary for the film copy produced from the original video tape to be in colour, but may be in black-and-white if so desired.

It should also be mentioned that the method according to the invention can also be applied for editing colour video material while using black-and-white video tape copied therefrom as a video work print for the editing, in which editing mode the same problems concerning the phase position for the periodic field sequence of the colour video signal occur. In this respect, the black-and-white video work print is processed in a manner corresponding to that described above with reference to the film work print. The method according to the invention can also be applied to advantage when editing colour video material with the use of a colour video tape copy thereof as a video tape work print and a semi-professional colour video recording equipment, e.g. a video cassette recorder, which is not capable of displacing the scene transitions automatically to positions satisfying the condition of the periodic field sequence of the video signal.

It can be pointed out still further that when applying the method according to the invention the further advantage is afforded, compared with conventional film editing techniques, whereby one and the same section of the original picture material can be used in a plurality of different scenes, without delays, changes, or additional expenses, despite the fact that only one film copy is available. For the additional scenes which shall include a section of the film copy already used, there is inserted in the edited film work print solely a black or empty "scene missing" leader of suitably the correct length, on which leader there is recorded the edge-number values for the first and the last frames in the desired scene, so that this information is available in the subsequent listing of the finally edited work print.

It will also be understood that the method according to the invention is not limited to the PAL-system, but can be used generally when editing kinematographic picture material which, when finalized, shall have the form of a colour video tape. What is required is for the work print used for the editing work to be provided with visual markings by means of which it can be ensured when editing the work print that the scene transitions are located so as not to break the rules of the video system used. For example, in the case of the NTSC-system used, inter alia, in the United States of America, such rules exist because 24 frames on the film are corresponded by 60 video fields on the video tape.

I claim:

1. A method for editing kinematographic colour picture material which in its finalized form shall be in the form of a colour video tape, comprising the following procedural steps:
    (a) using the originally shot picture material, which may be in the form of either colour film or colour video tape, for producing a copy in the other material form, so as to obtain a film copy and a video tape copy having the same picture content;
    (b) providing the film copy throughout its length with periodically occurring, visual markings from which it is possible, with the guidance thereof, to determine for each film frame the location of the corresponding video fields on the video tape copy within the periodic video field sequence of the video system being used;
    (c) storing the video tape copy as an original;
    (d) using the film copy as a work print to produce an edited film comprising a desired sequence of desired scenes, while ensuring with the guidance of said markings that at each splice between two mutually sequential scenes the last frame in the preceding scene and the first frame in the subsequent scene are such that their corresponding video fields on the video tape copy have immediately following locations in said periodic video field sequence of the video signal; and
    (e) using the video tape copy for producing an edited video tape in exact conformity with the edited film.

2. A method as claimed in claim 1, in which the colour video system used is the PAL-system, and in step (d) every second film frame is provided with a marking.

3. A method as claimed in claim 2, in which said markings comprise two different forms, said forms being used alternately with one another.

4. A method as claimed in claim 1 in which
    the original picture material is in film form;
    the marking of the film copy according to step (b) is carried out prior to producing the corresponding video tape copy by copying from the film copy in step (a); and
    ensuring in the copying step (a), by electronically analysing the video signal from the copying equipment used, that for each film roll being copied the periodic video field sequence of the video signal occupies a given phase position relative to said markings on said film, said phase position being the same for all film rolls being copied.

5. A method as claimed in claim 1 in which
    the original picture material is in film form;
    the marking of the film copy according to step (b) is carried out subsequent to producing the corresponding video tape copy by copying from the film copy in step (a);
    when transferring each film roll onto a corresponding video tape roll in copying step (a), recording at least a part of the said film roll also on an additional video tape and electronically analysing the video signal being recorded on said video tape roll and said additional video tape with respect to the phase position of its periodic video field sequence and electronically recording indications of said phase position of the video field sequence on said additional video tape in a manner such that said indications are visible during a subsequent play-back of said additional tape; and
    in the subsequent step (b) providing the film roll with said markings by passing said roll through a marking machine, while ensuring, by play-back and by observing said additional video tape, that when starting said marking machine it applies the markings to said film roll in accordance with said indications of the phase position of the periodic video field sequence on said additional video tape.

6. A method as claimed in claim 1, in which
    the original picture material is in video tape form; and
    the copying procedure according to step (b) are carried out simultaneously, by electronically analysing the video signal from the kinescope equipment used for the copying procedure with respect to the phase position of the periodic video field sequence of the video signal, and by electronically generating in the image being produced on the picture tube screen of the kinescope equipment markings of said kind coinciding with the phase position of the periodic video field sequence, whereby said markings are found also on the film copy being photographed from the picture tube of the kinescope equipment.

7. A method as claimed in claim 1, in which
    prior to the copying process according to step (a), each roll of the original picture material is provided with a reference symbol on at least one of its image frames, said symbol being unique for the roll in question and of such a nature as to be visible also on the corresponding image frame of the additional copy produced by said copying process;

subsequent to the copying step, there is determined in the film copy, with the aid of the edge numbers of the film, the position of each symbol-marked frame, and correspondingly in the video tape copy there is determined the position of each symbol-marked frame with the aid of the time code of said video tape, such as to obtain for each symbol-marked image frame information concerning both its position in the film copy, expressed in edge-number value, and its position in the video tape copy, expressed in a time-code value; and in step (e), there is first determined the edge-number values for the first frame and the last frame in each scene in the edited film obtained through step (d), these edge number values are converted into time code values for corresponding frames in the video tape copy with the guidance of the aforementioned established relationship between the edge number values and the time code values for the symbol-marked frames, whereafter the thus obtained time code values for the first and last frames of the scenes are used for conforming the video tape copy into exact conformity with the edited film.

* * * * *